US008569191B2

(12) United States Patent
Barnes et al.

(10) Patent No.: US 8,569,191 B2
(45) Date of Patent: Oct. 29, 2013

(54) REFRACTORY LINING FOR TITANIUM ORE BENEFICIATION

(75) Inventors: John James Barnes, Hockessin, DE (US); Dat Nguyen, Chadds Ford, PA (US); Peter Hill, Woodstown, NJ (US); Jay Scott Schickling, Hendersonville, TN (US)

(73) Assignee: E I du Pont de Nemours and Company, Wilmington, DE (US)

( * ) Notice: Subject to any disclaimer, the term of this patent is extended or adjusted under 35 U.S.C. 154(b) by 85 days.

(21) Appl. No.: 13/318,614

(22) PCT Filed: May 5, 2010

(86) PCT No.: PCT/US2010/033678
§ 371 (c)(1),
(2), (4) Date: Nov. 3, 2011

(87) PCT Pub. No.: WO2010/129643
PCT Pub. Date: Nov. 11, 2010

(65) Prior Publication Data

US 2012/0064371 A1 Mar. 15, 2012

Related U.S. Application Data

(60) Provisional application No. 61/175,619, filed on May 5, 2009.

(51) Int. Cl.
*C04B 35/106* (2006.01)

(52) U.S. Cl.
USPC .............................. 501/105; 75/301; 501/127

(58) Field of Classification Search
USPC ...................... 75/301; 428/689; 501/105, 127
See application file for complete search history.

(56) References Cited

U.S. PATENT DOCUMENTS

| | | | |
|---|---|---|---|
| 3,597,247 | A | 8/1971 | Reardon |
| 4,039,344 | A | 8/1977 | Nishikawa et al. |
| 4,823,359 | A | 4/1989 | Ault et al. |
| 5,283,215 | A | 2/1994 | Hosokawa et al. |

FOREIGN PATENT DOCUMENTS

| | | | |
|---|---|---|---|
| EP | 0479253 | | 4/1992 |
| EP | 479253 | A2 * | 4/1992 |
| JP | 6092723 | | 4/1994 |
| JP | 06092723 | A * | 4/1994 |
| JP | 10297958 | | 4/1997 |
| JP | 10324559 | | 12/1998 |
| JP | 11189460 | | 7/1999 |

(Continued)

OTHER PUBLICATIONS

International Search Report, Jul. 22, 2010.
Buchberger et al, RHI Bulletin 2003 (1), pp. 35-38 Development of Refractory Material for Use in the Chemical Engineering and Environmental Technology Fields.
Boymanns et al, Vortr. Poster—Symp. MaterialForsch. 1991 Corrosion-Resistant and Large Size Isostatically Pressed Parts for Hollow and Flat Glass Industry.

(Continued)

*Primary Examiner* — Kaj K Olsen
*Assistant Examiner* — Jared Wood

(57) ABSTRACT

The disclosure relates to a refractory which is resistant to corrosion which degrades the refractory during titanium-ore beneficiation in a furnace, particularly a rotary hearth furnace. In particular, the disclosure relates to a layered refractory lining for a furnace, for use in a titanium ore beneficiation process wherein a titanium oxide-rich molten slag is formed, comprising:

(a) a first layer comprising a major proportion of alumina and a minor proportion of zirconia;
(b) a second layer comprising a resistant agent for the molten slag; wherein the second layer is between the slag and the first layer.

11 Claims, 4 Drawing Sheets

(56) References Cited

FOREIGN PATENT DOCUMENTS

| | | | |
|---|---|---|---|
| JP | 11199316 | | 7/1999 |
| JP | 2000335978 | | 12/2000 |
| JP | 2001328861 | | 11/2001 |
| RO | 82662 | | 10/1983 |
| WO | WO2007/027998 | | 3/2007 |
| WO | WO 2007027998 | A2 * | 3/2007 |

OTHER PUBLICATIONS

Turkin et al., Ogneupory 1989 (6) pp. 13-16 Sintered Chromium-Containing Oxide Composites.

Elstad H. Eriksen et al, Equilibrium Between Titania Slags and Metallic Iron, Heavy Minerals 2007, pp. 35-42.

* cited by examiner

REFRACTORY LINING FOR TITANIUM ORE BENEFICIATION

BACKGROUND OF THE DISCLOSURE

1. Field of the Disclosure

The disclosure relates to a layered refractory lining for a furnace used in the beneficiation of titanium ore. More particularly, the disclosure relates to a refractory body for lining a furnace, the refractory body comprising a major proportion of alumina and a minor proportion of zirconia.

2. Description of the Related Art

Rotary hearth furnaces have been described for the beneficiation of low grade titanium ores, such as ilmenite, which contain iron oxide, titanium dioxide, and metal oxide impurities, into products containing high levels of titanium oxides such as titanium slag, and metallic iron. However, beneficiating a low grade ore which contains titanium dioxide and metal oxide impurities by reduction in a rotary hearth process can pose processing challenges. In particular, the titanium-rich slags produced can be highly corrosive to the refractory materials which are typically used to line the furnace, causing degradation of the lining, which results in increased production downtime to repair or replace the refractory.

Unlike typical ilmenite smelting processes, in which a freeze lining of the slag acts as a protective barrier between the refractory and the molten slag, the molten slag in a rotary hearth process can be in direct contact with the refractory, and therefore a corrosion-resistant refractory is essential.

SUMMARY OF THE DISCLOSURE

The disclosure relates to a layered refractory lining for a furnace, for use in a titanium ore beneficiation process wherein a titanium oxide-rich and iron oxide-rich molten slag is formed, comprising:

(a) a first layer comprising a major proportion of alumina and a minor proportion of zirconia;

(b) a second layer comprising a resistant agent reaction product of the molten slag and the alumina and the zirconia; wherein the second layer is between the molten slag and the first layer.

The second layer can be formed in situ during the beneficiation process or the second layer can be preformed by applying to a surface of the first layer a paste comprising a source of titania, a source of carbon, and a binder to form a coating thereon, melting the coating to cause a reaction of the coating with the first layer and form a second layer.

The furnace can be an electric arc furnace or a rotary hearth furnace.

The first layer can comprise alumina and zirconia having about 90 to about 99 wt. % alumina, and about 1 to about 10 wt. % zirconia, based on the entire weight of the first layer. More specifically, the alumina ranges from about 97 wt. % to about 98 wt. % based on the entire weight of the first layer and the zirconia ranges from about 1 wt. % to about 2 wt. % based on the entire weight of the first layer. The layered refractory lining can further comprise calcia and magnesia, yttrium oxide, cerium oxide, or mixtures thereof.

In another aspect, the disclosure relates to a process for forming a resistant agent in a refractory body of a furnace for use in a titanium ore beneficiation process, comprising:

(i) forming agglomerates comprising carbon-based materials and a titanium-bearing ore, the quantity of carbon of the agglomerates being sufficient for, at an elevated temperature, reducing ferric oxide to ferrous oxide and forming a slag that is comprised of titanium oxide and iron oxide;

(ii) introducing the agglomerates onto a carbon bed of a moving hearth furnace, wherein the moving hearth furnace comprises a refractory lining comprising a first layer comprising a major proportion of alumina and a minor proportion of zirconia;

(iii) heating the agglomerates in the moving hearth furnace to a temperature sufficient for reducing and melting the agglomerates to produce a titanium oxide-rich molten slag, which contacts the refractory lining to produce a second layer comprising a resistant agent which is a reaction product of the slag, the alumina and the zirconia; wherein the second layer is formed between the slag and the first layer.

In yet another aspect, the disclosure relates to a resistant agent for a titanium oxide-rich molten slag comprising a reaction product of a first layer of a refractory lining comprising a major proportion of alumina and a minor proportion of zirconia and the titanium oxide-rich molten slag, the resistant agent being resistant to degradation, including cracking in the presence of titanium oxide-rich molten slag. The resistant agent can be the reaction product of the titanium oxide of the slag and the alumina and zirconia of the first layer.

In one embodiment, the disclosure herein can be construed as excluding any element or process step that does not materially affect the basic and novel characteristics of the composition or process. Additionally, the disclosure can be construed as excluding any element or process step not specified herein.

DETAILED DESCRIPTION OF THE DISCLOSURE

Figure 1:
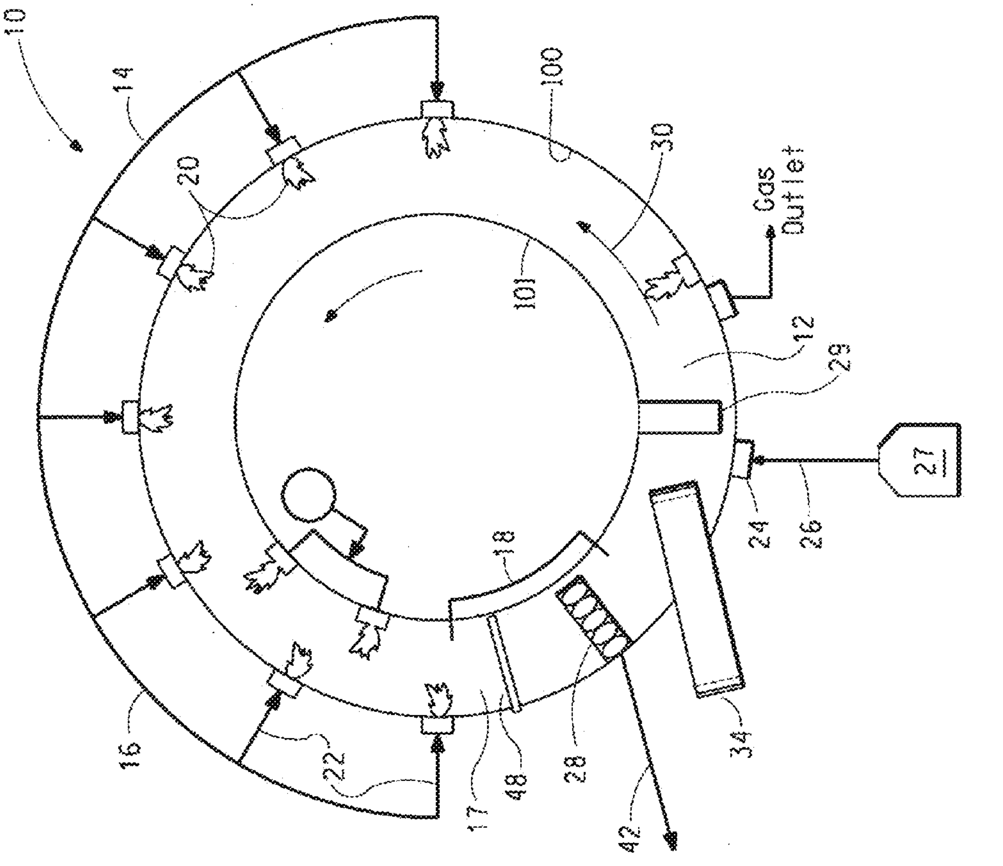
FIG. 1 is a top view of a rotary hearth furnace for the reduction of titanium-rich ores and production of iron metal and high grade titanium oxides.

In one of the widely used methods of titanium ore beneficiation, the ore containing titanium oxides is converted in a furnace to slag containing higher concentrations of titanium oxides which can be suitable for use in the production of titanium dioxide pigment. The disclosure relates to a refractory body for lining at least a portion of a furnace, more particularly, the refractory body forms a layered refractory lining, for use in a titanium ore beneficiation process. For this process, the ore containing titanium oxides is formed into agglomerates comprising carbon-based material and the titanium ore. The agglomerates are fed to the furnace for conversion to slag and other products of reaction. The quantity of carbon of the agglomerates is sufficient for, at an elevated temperature, reducing ferric oxide to ferrous oxide and forming a molten slag comprising titanium oxide and ferrous oxide. The agglomerates can be fed onto a carbon bed of a moving hearth furnace.

A refractory body that is resistant to the corrosive properties of titanium-rich molten slag is described. The refractory body comprises a first layer comprising alumina-zirconia.

More particularly, the refractory body comprises a major proportion of alumina and a minor proportion of zirconia. The ratio of alumina to zirconia can be represented by the formula $$xAl_2O_3{:}yZrO_2$$

wherein x ranges from about 90 to about 99% by weight based on the total weight of the refractory body, and wherein y ranges from about 1 to about 10% by weight based on the total weight of the refractory body. More particularly, x ranges from about 95 to about 99% by weight, based on the total weight of the refractory body, and wherein y ranges from about 1 to about 5% by weight based on the total weight of the refractory body. Even more particularly, x is about 97% to about 98% by weight and y is about 1 to about 2% by weight based on the total weight of the refractory body. The refractory body can contain a minor proportion of other compounds which do not undermine the corrosion resistance property of the refractory body such as one or more oxides of an alkali metal or an alkaline earth metal or an oxide of an element of group IVB of the Periodic Table of the Elements (Sargent-Welch Scientific Company 1979). Some of these compounds may enhance the stability of the refractory, and thereby contribute to its performance in contact with the slag. Examples are selected from the group consisting of calcium oxide, magnesium oxide, yttrium oxide, and cerium oxide and mixtures thereof. The total amount of these oxides can be less than 1 wt. %, more typically less than 0.5 wt. %, typically from about 0.05 wt. % to about 1 wt. %, even more typically the range is about 0.05 wt. % to about 0.5 wt. %, based on the total weight of the refractory body.

In particular, the first layer can be free of silica.

The refractory body further comprises a second layer comprising a resistant agent for the slag. The resistant agent can inhibit corrosion of the refractory body exposed to the titanium-rich molten slag thus preventing the formation of cracks in the refractory body. The resistant agent can be a reaction product of the molten slag, which forms from reduction of the titanium ore, and the alumina and zirconia of the refractory. The second layer can also comprise other products of reaction of the molten slag and the components of the refractory of the first layer, and, optionally, one or more unreacted components of the first layer and unreacted slag. The second layer can be formed during the ore beneficiation process by reaction of the molten slag with the first layer. More particularly the second layer can be formed during the ore beneficiation process by reaction of the components of the first layer and the molten slag. Even more particularly the second layer can be formed during the ore beneficiation process by reaction of the alumina and zirconia of the first layer with the products of reduction of the titanium ore in the molten slag.

Alternatively, the second layer can be made in a preforming step. Preforming of the second layer can be achieved by applying to the surface of the refractory liner, typically in the rotary hearth furnace, a paste that is comprised of a source of titania, such as ilmenite, a source of carbon, such as coal, and a binder suitable for making a paste of the source of titania and carbon which will adhere to the first layer and form a coating thereon. The amount and type of binder will depend on the process conditions but would be apparent to those skilled in the art of refractories. The furnace can then be heated to a temperature sufficient to melt the coating and cause reaction of the coating with the refractory to form the second layer. Thus, the second layer is formed prior to the beneficiation and can be considered to be made in a preforming step. The resistant agent can thus form in the preformed second layer by reaction of the first layer, more particularly the components thereof, with the components of the preformed second layer at an elevated temperature, more particularly at the temperatures for carrying out the ore beneficiation.

The refractory body can be in the form of bricks, tiles or a substantially continuous layer, more particularly a continuous layer. A commercially available refractory material suitable for the refractory body is Korrath C98Zr sold by Rath Refractories, Inc. of Milledgeville, Ga. The C98Zr refractory contains 97.7 wt. % alumina, 1.8 wt. % zirconia, 0.2 wt. % (magnesia+calcia), 0.1 wt. % silica, and 0.2 wt. % alkali metals, based on the entire weight of the refractory body.

Typically the furnace can be a moving hearth furnace, more typically a rotary hearth furnace. However, an electric arc furnace can also be used.

Referring to the drawings and more particularly to FIG. 1, a rotary hearth furnace can be used for reducing the charge. A furnace 10 can be used having the configuration of a typical industrial moving hearth furnace. The rotary hearth furnace has a surface 30 that is rotatable from a material feed zone 12. The hearth 30 rotates from the material feed zone through a plurality of burner zones represented by first burner zone 14, second burner zone 16, and third burner zone 17. A reaction zone spans at least a portion of the burner zones. A discharger zone 18 comprises a cooling plate 48 and discharge device 28. The maximum temperature of the furnace is typically reached in third burner zone 17. The first and second stages of the process of this disclosure occur in the reaction zone. The surface 30 is rotatable in a repetitive manner from the discharge zone 18 to the feed material zone 12 and through the reaction zone for continuous operation. The burner zones can each be fired by a plurality of air/fuel, oxy/fuel, or oxygen enriched burners 22 to produce a flame 20.

The material feed zone 12 includes an opening 24 and a feed mechanism 26 by which the agglomerates are charged to the furnace. A layer comprising carbon can be located on at least a major proportion of the surface 30, or the entire surface can comprise a layer comprising carbon upon which the agglomerates are placed. The layer comprising carbon can be placed on the surface by any convenient means, typically by a solid material feeder 34. The agglomerates can be leveled to a useful height above the surface by a leveler 29 that spans the width of the surface 30. The agglomerates are continuously fed to the furnace by the feed mechanism as the surface is rotated around the furnace and through each zone. The speed of rotation is controlled by adjusting a variable speed drive.

The disclosure also relates to the formation of a resistant agent for titanium oxide-rich molten slag. In this process, agglomerates comprising carbon-based material and the titanium ore are formed, wherein the quantity of carbon of the agglomerates is sufficient for, at an elevated temperature, reducing ferric oxide to ferrous oxide and forming a molten slag comprising titanium oxide and ferrous oxide; introducing the agglomerates onto a carbon bed of a moving hearth furnace, wherein the moving hearth furnace comprises a refractory lining comprising a first layer comprising alumina present in a major proportion and a minor proportion of zirconia; and heating the agglomerates in the moving hearth furnace to a temperature sufficient for reducing and melting the agglomerates to produce a titanium oxide-rich and iron oxide-rich molten slag and a second layer comprising a resistant agent for the slag; wherein the second layer forms between the slag and the first layer.

A low grade ore containing titanium oxides and iron oxides can be used. Titanium present in low grade ore occurs in complex oxides, usually in combination with iron, and also containing oxides of other metals and alkaline earth elements. Titanium is commonly found as ilmenites, either as a sand or a hard rock deposit. Low-grade titanium ores, such as ilmenite sand can contain from about 45 to about 65 wt. % titanium dioxide, about 30 to about 50 wt. % iron oxides and about 5 to about 10 wt. % gangue, based on the entire weight of the sand. Rock deposits of ilmenite are reported to contain from about 45 to about 50 wt. % titanium dioxide, about 45 to about 50 wt. % iron oxides, and about 5 to about 10 wt. % gangue, based on the entire weight of the rock deposit. The process of this disclosure can employ such titanium ores.

The agglomerates, useful as the charge to the rotary hearth process, comprise the ore and a quantity of carbon sufficient for a first stage melting wherein ferric oxide reduction to ferrous oxide occurs under reducing conditions. The exact amount of carbon can vary depending upon the iron oxide content of the ore, and particularly upon the ferric oxide content. But, less than stoichiometric quantities of carbon (i.e., quantities of carbon sufficient to reduce all the iron oxides in the ore to metallic iron) can be used so that the agglomerates will melt before a second stage metallizing wherein the majority of the ferrous oxide reduction to iron metal occurs. A minor degree of such metallizing can occur in the first stage and is not detrimental to the process of this disclosure.

When the amount of carbon is referred to, it means the fixed carbon content of the material which provides a source of carbon. Fixed carbon content is determined in the proximate analysis of solid fuels, such as coal, by heating a sample, in the absence of air, to 950° C. to remove volatile matter (which typically includes some carbon). The carbon that remains at 950° C. is the fixed carbon content.

For a typical ore that can be used in the process of this disclosure and containing about 30 to about 50% iron oxides, the amount of carbon can range from about 0.5 to about 8.0 wt. %, more typically about 1.0 to about 6.0 wt. % based on the entire weight of the agglomerate. For ilmenite and/or sand containing ilmenite, the amount of carbon can range from about 1.0 to about 8.0 wt. %, more typically about 2.0 to about 6.0 wt. % based on the entire weight of the agglomerate. For rock deposits of ilmenite, the amount of carbon can range from about 0.5 to about 5.0 wt. %, more typically about 1.0 to about 3.0 wt. % based on the entire weight of the agglomerate.

Typically, the amount of carbon in the agglomerates is sufficient for reducing the ferric oxide but insufficient to metallize more than about 50% of the ferrous oxide, more typically insufficient to metallize more than about 20% of the ferrous oxide based on the agglomerate.

The carbon source useful in the agglomerates can be any carbonaceous material such as, without being limited to, coal, coke, charcoal, and petroleum coke.

Agglomerates can be formed by mixing the ore and the carbon source, optionally together with a binder material, and shaping the mixture into pellets, briquettes, extrudates or compacts which are usually dried at temperatures ranging from about 100° C. to about 200° C. Equipment capable of mixing and shaping the feed components are well known to those skilled in the art. Typically the agglomerates range in average diameter from about 2 to about 4 cm for ease of handling.

The optional binder material can be, without limitation to, organic binders or inorganic binders such as bentonite or hydrated lime. Suitable amounts of binder range from about 0.5 to about 5 wt. %, typically about 1 to about 3 wt. % based on the entire weight of the agglomerates.

Unlike some ore reduction processes, the ore of the agglomerates can be used without being ground into a fine powder. The ore can, however, be crushed and/or screened, before being formed into agglomerates, to an average particle size ranging from about 0.1 to about 1 mm to separate out any large chunks which might pose handling problems. For example, when rock deposits are used, they are usually crushed and screened to obtain ore particles ranging in average size of about 0.1 to about 1 mm.

The agglomerates can be charged to a rotary hearth furnace wherein they are heated to a temperature sufficient for the first stage melting to produce a ferrous oxide-rich molten slag. In a typical process, the agglomerates can be charged through a feed chute which deposits them onto a bed of carbonaceous material, typically a bed of coal or coke particles. The thickness of the bed can range from about 1 to about 5 cm.

The temperatures inside the moving hearth furnace sufficient for the first stage melting can range from about 1300° C. to about 1800° C., typically from about 1400° C. to about 1750° C., and more typically from about 1500° C. to about 1700° C. The particular temperature will depend on ore composition. The period of time for this melting stage can range from about 1 minute to about 5 minutes.

In the first stage melting, the carbon content of the agglomerates is sufficient to reduce the ferric oxide to ferrous oxide, but insufficient to complete any substantial metallization and, additionally, not sufficient for the complete reduction of ferrous oxide to iron metal.

The ferrous oxide-rich molten slag which results from the first stage melting, contacts the carbon bed under reducing conditions. Through this contact, the ferrous oxide is further reduced in the second stage metallizing to produce the iron metal product.

The temperature inside the moving hearth furnace in the second stage metallizing is sufficiently high to keep the slag in a molten state as the ferrous oxide metallization occurs. Suitable temperatures inside the hearth furnace for this purpose can range from about 1500° C. to about 1800° C., typically from about 1600° C. to about 1750° C., and more typically from about 1600° C. to about 1700° C. The particular temperature required will vary depending upon ore composition.

On a large scale furnace, the temperature inside the furnace in the first stage can be at least about 100° C. lower than the temperature in the second stage.

The period of time for this second stage metallizing can be longer than that for the first stage melting and can range from about 5 minutes to about 20 minutes. During the first stage, reduction of ferric oxide in the presence of the carbon contained in the agglomerates and melting occur rapidly. In contrast, in the second stage, allowing sufficient time for the ferrous oxide-rich molten slag to flow over the carbon bed during the metallization can enhance production of large metal particles since the iron droplets of the molten slag will coalesce into larger droplets which maintain their size during cooling to form solid metal particles.

As the second stage metallization proceeds, the slag becomes less fluid and the titanium concentration of the slag increases. The conditions sufficient for maintaining slag fluidity can help the iron droplets in the molten slag to coalesce which facilitates the formation of the easily separable large particles of iron.

The slag solidifies as the metallization approaches completion. Preferably, the metallization is carried out until at least about 90% completion, based on the agglomerates, even more preferably until at least about 95% completion. The iron metal which can be in the form of large granules is readily separable from the solid slag by cost effective processes. Mechanical processes are ideally used for separating the iron metal. Chemical processes such as chemical leaching are not needed. Additionally extensive mechanical separation processes such as intensive grinding are not needed.

Typical methods for separating the metal include crushing, grinding, screening and magnetic separation.

Typically the iron granules of the process range in average diameter from about 0.05 to about 10 mm, and more typically from about 0.1 to about 5 mm.

Typically, the solid slag product of the process comprises greater than about 85% titanium oxides, and more typically greater than about 87% titanium oxides, based on the entire weight of the solid slag product, after separation of the mechanically separable metallic iron. The term "titanium oxides" means $TiO_2$, $Ti_3O_5$, and $Ti_2O_3$. The solid slag product can also contain smaller amounts of titanium in the form of TiO, TiC, and TiN. The solid slag product can contain a minor amount of residual metallic iron. The residual metallic iron is usually the portion of metallic iron particles below about 50 microns in diameter. Usually the amount of residual metallic iron is less than about 6%, more typically less than about 4% based on the entire weight of the solid slag product, after mechanical separation of the mechanically separable metallic iron granules. There can be other small amounts of impurities such as FeO, and other oxides. The amount of these other impurities is usually less than 8% and more typically less than 6% of the entire weight of the solid slag product.

The moving hearth furnace can be any furnace which is capable of exposing the agglomerates to at least two high temperature zones on a bed of carbon. A suitable furnace can be a tunnel furnace, a tube furnace or a rotary hearth furnace. The process can employ a single furnace structure.

Figure 2:
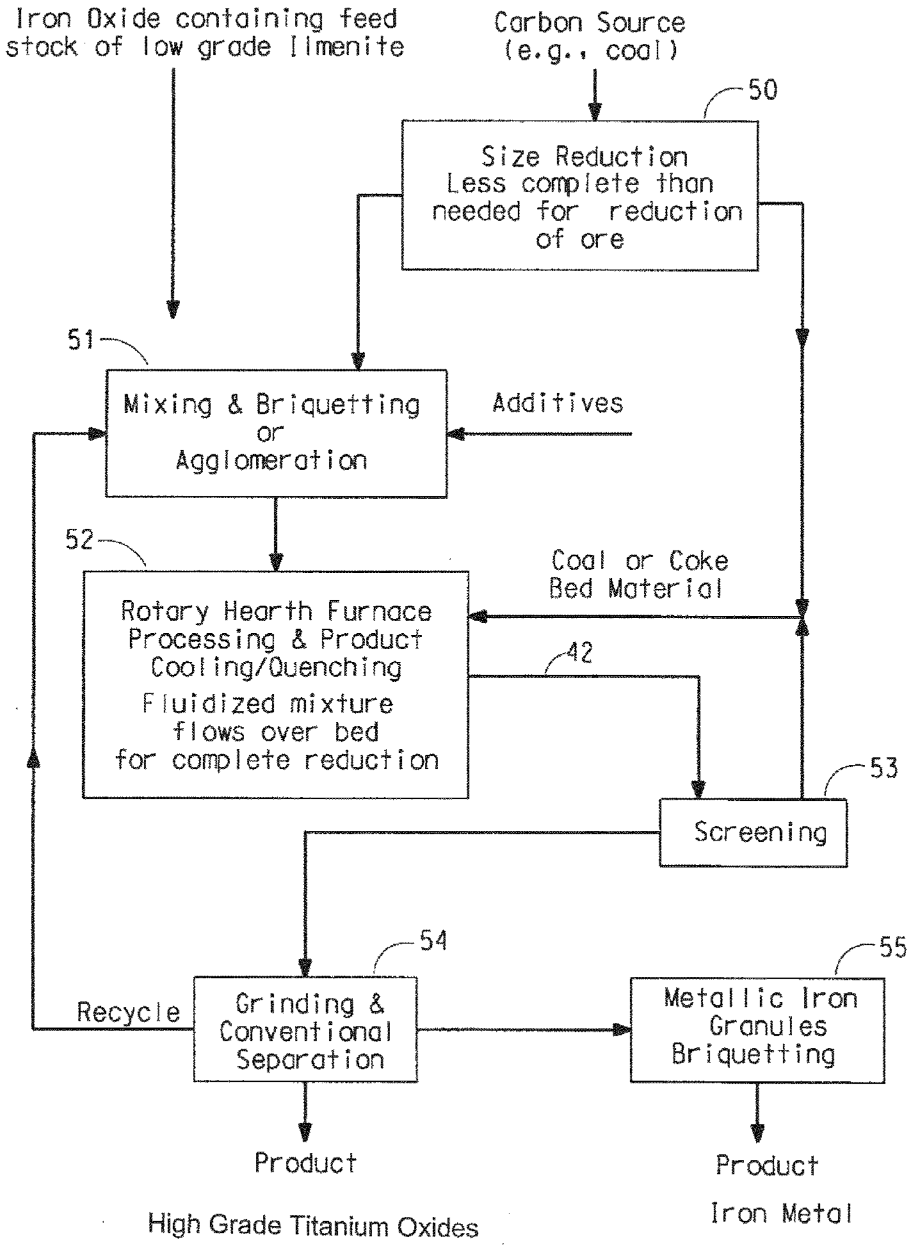
FIG. 2 is a simplified schematic diagram of the process of this disclosure.

Referring to FIG. 2, the process is shown whereby the ore is introduced to the mixing zone 51. The carbon can be introduced to a size reduction zone 50 prior to introduction to the mixing zone 51 wherein the ore and the carbon together with any optional additives, such as binders, are mixed together and formed into agglomerates. The agglomerates are introduced to rotary hearth furnace zone 52 wherein the ferric oxide of the agglomerates is reduced and metallized as described herein. The hot product 42 as shown in FIG. 2 is cooled by any convenient means. The cooled product is then screened in the screening zone 53, then ground in grinding zone 54 to separate the iron metal from the high grade titanium oxides product. Recycle material can also be separated and introduced to the mixing zone 51. The iron metal product can be formed into briquettes in briquetting zone 55 from which the iron metal product is withdrawn.

In one embodiment, the disclosure herein can be construed as excluding any element or process step that does not materially affect the basic and novel characteristics of the composition or process. Additionally, the invention can be construed as excluding any element or process step not specified herein.

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

The following Examples illustrate the present disclosure. All parts, percentages and proportions are by weight unless otherwise indicated.

Comparative Example 1

Figure 3:
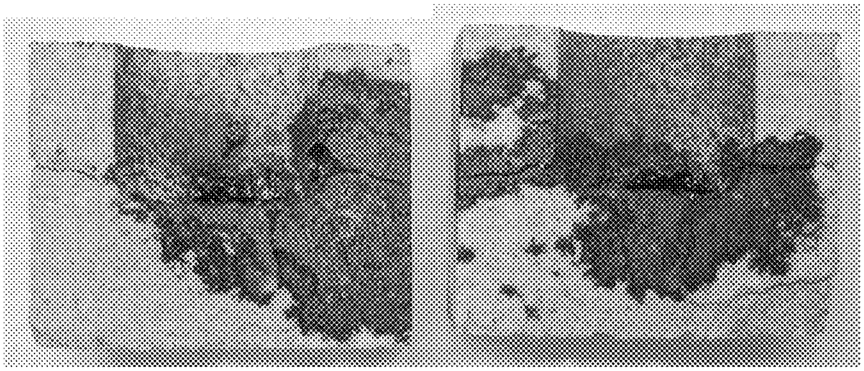
FIG. 3 is a photograph of a magnesia-based refractory of Comparative Example 1.

In this Example, a refractory containing 92 wt. % magnesia, 6 wt. % alumina, 1 wt. % silica, and 1 wt. % calcia, based on the entire weight of the refractory (Magnel HF sold by ANH Refractories of Moon Township, Pa.) was used. A cavity having a depth of 15 mm was drilled into a 50 mm wide×50 mm long×40 mm tall refractory brick to form a cup. A mixture consisting of 92.5 wt. % ilmenite titanium-bearing ore (containing about 60 wt % TiO2, based on the entire weight of the ore), 5.5 wt. % bituminous coal, and 2 wt. % binder, based on the entire weight of the mixture was shaped into pellets and dried at a temperature of about 110° C. The dried pellets were about 20 mm in diameter. Such a pellet was placed into the cup, which contains a thin layer of a carbon-based material, which may include certain bituminous or anthracite coals, metallurgical cokes, and petroleum cokes, including sponge coke, needle coke, shot coke, and fluid coke and the cup was placed in a box furnace and heated to 1700° C. for 15 minutes, during which time the generation of a titanium-rich slag inside the cavity of the cup was observed. The temperature was then increased to 1735° C. for a period of 4 hours. The cup was removed from the furnace, and allowed to cool. FIG. 3 is a photograph of a cross-section of the cup showing slag penetration into the refractory and cracking of the cup. The extensive cracking indicated that the refractory composition was unable to resist damage from the titania-rich slag. The cup was examined using optical microscopy and scanning electron microscopy/electron dispersive spectroscopy which revealed that the magnesium oxide phase in the refractory reacted with the slag, resulting in the transformation to phases that contain titanium and iron, in addition to magnesium. Cracking was evident in the microstructure of the refractory, caused by the transformation of magnesium oxide.

Comparative Example 2

This Example followed the same procedure as Comparative Example 1, except the refractory used contained 90 wt. % alumina, 9.2 wt. % silica, 0.1 wt. % $Fe_2O_3$, 0.1% $TiO_2$, 0.1 wt. % (CaO+MgO), 0.2 wt. % alkali metals. The remainder (0.3 wt. %) was not specified by the manufacturer, all based on the entire weight of the refractory (Korrath C90 sold by Rath Refractories, Inc. of Milledgeville, Ga.).

Figure 4:
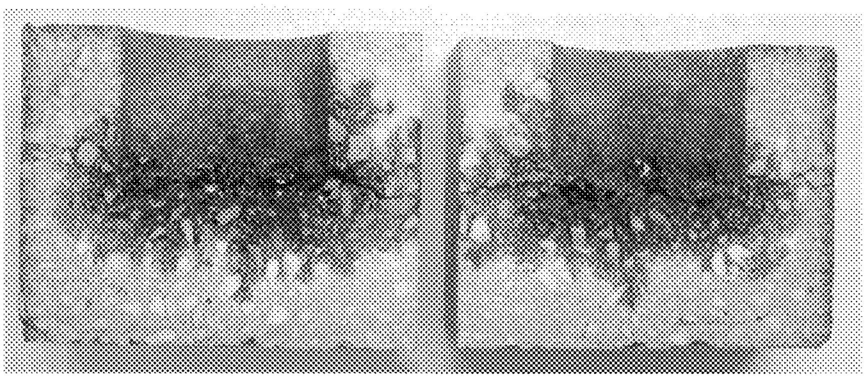
FIG. 4 is a photograph of the alumina-based refractory of Comparative Example 2.

FIG. 4 is a photograph of a cross-section of the cup showing extensive slag penetration into the refractory and cracking of the cup, even into the sidewalls of the cup. The extensive cracking indicated that the refractory composition was unable to resist damage from the titania-rich molten slag that formed during the reduction process.

Comparative Example 3

This Example followed the same procedure as Comparative Example 1, except a refractory containing 99.6 wt. % alumina, 0.07 wt. % $SiO_2$, 0.05 wt. % $Fe_2O_3$, 0.03 wt. % $TiO_2$, 0.1 wt. % (CaO+MgO), 0.1 wt. % ($Na_2O+K_2O$), based on the entire weight of the refractory was used. The remainder (0.05%) was not specified by the manufacturer, Rath Refractories, Inc. of Milledgeville, Ga.

Figure 5:
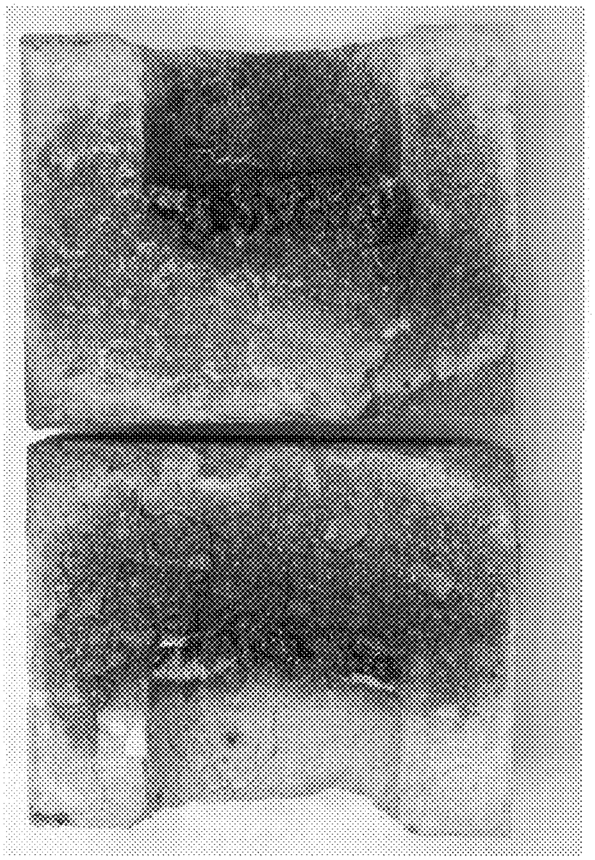
FIG. 5 is a photograph of the alumina-based refractory of Comparative Example 3.

Examination of the cup revealed that the slag penetrated the refractory and formed a product layer. The cup also had extensive cracking including at the interface between the areas penetrated by the slag and areas that were not penetrated by the slag. The extensive cracking indicated that the refractory composition was unable to resist damage from the titania-rich molten slag that formed during the reduction process. FIG. 5 is a photograph of a cross-section of the cup showing the damage to the cup resulting from the process.

Example 4

Figure 6:
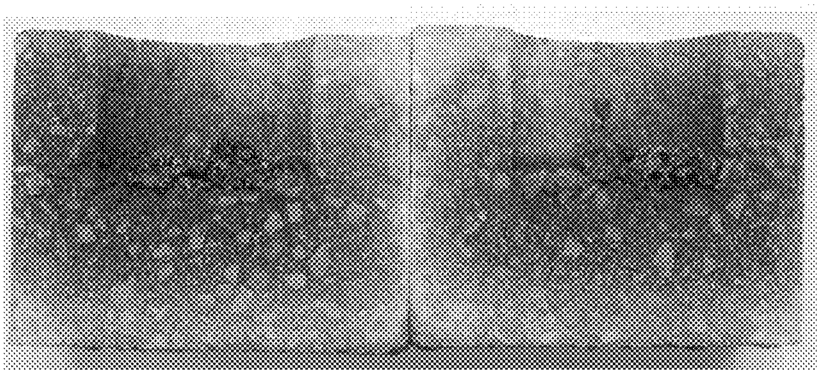
FIG. 6 is a photograph of the alumina-based refractory of Example 4.

This Example followed the same procedure as Comparative Example 1 except a refractory containing 97.7 wt. % alumina, 1.8 wt. % zirconia, 0.2 wt. % (magnesia+calcia), 0.1 wt. % silica, and 0.2 wt. % alkali metals, based on the entire weight of the refractory body, was used. FIG. 6 is a photograph of a cross-section of the cup showing that the slag had penetrated into the refractory and formed a product layer but no evidence of cracks in the cup was observed.

Examination of the cup using optical microscopy and scanning electron microscopy/electron dispersive spectroscopy revealed no evidence of cracking on a microscopic scale. Examination of the chemical composition of the product layer that formed in the cup revealed aluminum titanate, the presence of zirconia, unreacted refractory material, and unreacted slag. The lack of cracking indicated that the refractory composition was capable of resisting damage from exposure to the high temperatures of the furnace and the titania-rich molten slag that formed during the reduction process.

The description of illustrative and preferred embodiments of the present disclosure is not intended to limit the scope of the disclosure. Various modifications, alternative constructions and equivalents may be employed without departing from the true spirit and scope of the appended claims.

What is claimed is:

1. A layered refractory lining for a furnace, for use in a titanium ore beneficiation process wherein a titanium oxide-rich and iron oxide-rich molten slag is formed, comprising:

(a) a first layer comprising alumina and zirconia having about 90 to about 99 wt. % alumina, and about 1 to about 10 wt. % zirconia, based on the entire weight of the first layer;

(b) a second layer comprising a resistant agent reaction product of the molten slag and the alumina and the zirconia; wherein the second layer is between the molten slag and the first layer; and wherein the total amount of calcium oxide, magnesium oxide, yttrium oxide and cerium oxide is less than 1 wt. %, based on the total weight of the refractory body.

2. The layered refractory lining of claim 1 wherein the second layer is formed in situ during the beneficiation process.

3. The layered refractory lining of claim 1 wherein the furnace is an electric arc furnace.

4. The layered refractory lining of claim 1 wherein the furnace is a rotary hearth furnace.

5. The layered refractory lining of claim 1 wherein the alumina ranges from about 97 wt. % to about 98 wt. % based on the entire weight of the first layer.

6. The layered refractory lining of claim 1 wherein the zirconia ranges from about 1 wt. % to about 2 wt. % based on the entire weight of the first layer.

7. The layered refractory lining of claim 1 further comprising calcia or magnesia or mixtures thereof.

8. The layered refractory lining of claim 1 further comprising yttrium oxide or cerium oxide or mixtures thereof.

9. A process for forming a resistant agent in a refractory body of a furnace for use in a titanium ore beneficiation process, comprising:

(i) forming agglomerates comprising carbon-based materials and a titanium-bearing ore, the quantity of carbon of the agglomerates being sufficient for, at an elevated temperature, reducing ferric oxide to ferrous oxide and forming a slag that is comprised of titanium oxide and iron oxide;

(ii) introducing the agglomerates onto a carbon bed of a moving hearth furnace, wherein the moving hearth furnace comprises a refractory lining comprising a first layer comprising alumina and zirconia having about 90 to about 99 wt. % alumina, and about 1 to about 10 wt. % zirconia, based on the entire weight of the first layer;

(iii) heating the agglomerates in the moving hearth furnace to a temperature sufficient for reducing and melting the agglomerates to produce a titanium oxide-rich molten slag, which contacts the refractory lining to produce a second layer comprising a resistant agent which is a reaction product of the slag, the alumina and the zirconia; wherein the second layer is formed between the slag and the first layer; and wherein the total amount of calcium oxide, magnesium oxide, yttrium oxide and cerium oxide is less than 1 wt. %, based on the total weight of the refractory body.

10. A resistant agent for a titanium oxide-rich molten slag comprising:

a reaction product of a first layer of a refractory lining comprising alumina and zirconia having about 90 to about 99 wt. % alumina, and about 1 to about 10 wt. % zirconia, based on the entire weight of the first layer and the titanium oxide-rich molten slag, wherein the resistant agent is the reaction product of the titanium oxide of the slag and the alumina and zirconia of the first layer; and wherein the total amount of calcium oxide, magnesium oxide, yttrium oxide and cerium oxide is less than 1 wt. %, based on the total weight of the refractory body.

11. A preformed layered refractory lining for a furnace, for use in a titanium ore beneficiation process wherein a titanium oxide-rich and iron oxide-rich molten slag is formed, comprising:

(a) a first layer comprising alumina and zirconia having about 90 to about 99 wt. % alumina, and about 1 to about 10 wt. % zirconia, based on the entire weight of the first layer; and (b) a paste comprising a source of titania, a source of carbon, and a binder, wherein the first layer and the paste are heated prior to beneficiation so that paste forms a second layer attached to the first layer.

* * * * *